United States Patent [19]
Cox

[11] Patent Number: 6,039,003
[45] Date of Patent: Mar. 21, 2000

[54] LITTER BOX CLEANING SYSTEM, COMPONENTS AND METHOD

[75] Inventor: James Stacy Cox, Fayetteville, Ark.

[73] Assignee: LAP Licensing, LC., Fayetteville, Ark.

[21] Appl. No.: 09/310,534

[22] Filed: May 12, 1999

Related U.S. Application Data

[60] Provisional application No. 60/106,986, Nov. 4, 1998.

[51] Int. Cl.⁷ .................................................. A01K 29/00
[52] U.S. Cl. ............................................................ 119/166
[58] Field of Search ................................... 119/161, 165, 119/166

[56] References Cited

U.S. PATENT DOCUMENTS

| | | | |
|---|---|---|---|
| 3,809,013 | 5/1974 | Rigney et al. | 119/1 |
| 4,117,804 | 10/1978 | Moore et al. | 119/166 |
| 4,279,217 | 7/1981 | Behringer | 119/1 |
| 4,296,709 | 10/1981 | Schulein, Jr. | 119/1 |
| 4,312,295 | 1/1982 | Harrington | 719/1 |
| 4,325,882 | 4/1982 | Miller | 209/251 |
| 4,386,579 | 6/1983 | Harsh et al. | 119/1 |
| 4,723,510 | 2/1988 | Skillestad | 119/1 |
| 4,784,082 | 11/1988 | Wolfe | 119/1 |
| 4,787,334 | 11/1988 | Bassine | 119/1 |
| 4,817,560 | 4/1989 | Prince et al. | 119/1 |
| 4,858,559 | 8/1989 | Allen | 119/1 |
| 4,870,924 | 10/1989 | Wolfe | 119/1 |
| 4,872,420 | 10/1989 | Shepard | 119/1 |
| 4,919,078 | 4/1990 | Morrison | 119/1 |
| 5,031,578 | 7/1991 | Hammons et al. | 119/167 |
| 5,048,464 | 9/1991 | Shirley | 119/166 |
| 5,048,465 | 9/1991 | Carlisi | 119/166 |
| 5,062,392 | 11/1991 | Lavash | 119/167 |
| 5,121,712 | 6/1992 | Schulein, Jr. et al. | 119/167 |
| 5,165,366 | 11/1992 | Harvey | 119/165 |
| 5,167,204 | 12/1992 | Nussle | 119/166 |
| 5,168,834 | 12/1992 | Buschur | 119/166 |
| 5,207,772 | 5/1993 | Lauretta et al. | 119/167 |
| 5,226,388 | 7/1993 | McDaniel | 119/166 |
| 5,259,340 | 11/1993 | Arbogast | 119/166 |
| 5,267,530 | 12/1993 | Zamoyski | 119/166 |
| 5,325,815 | 7/1994 | Gumpesberger | 119/166 |
| 5,477,812 | 12/1995 | Waters | 119/166 |
| 5,509,379 | 4/1996 | Hoeschen | 119/166 |
| 5,544,620 | 8/1996 | Sarkissian | 119/166 |
| 5,577,462 | 11/1996 | Korth | 119/166 |
| 5,601,052 | 2/1997 | Rood et al. | 119/166 |
| 5,622,140 | 4/1997 | McIlnay-Moe | 119/166 |
| 5,673,648 | 10/1997 | Ayle | 119/166 |
| 5,678,508 | 10/1997 | Butzen | 119/166 |
| 5,752,465 | 5/1998 | Page | 119/166 |
| 5,785,000 | 7/1998 | Barbary | 119/166 |
| 5,799,610 | 9/1998 | Poulos | 119/166 |
| 5,823,137 | 10/1998 | Rood et al. | 119/166 |

*Primary Examiner*—Thomas Price
*Attorney, Agent, or Firm*—Head, Johnson & Kachigian

[57] ABSTRACT

The invention includes a litter box with an associated cleaning assembly that may utilize a bag and a box frame that may include a storage area for the assembly. The litter box has a rectangular frame with an open top and a floor separated by four integral walls. The cleaning assembly includes two rakes that each have a handle with several spaced apart teeth. Each tooth has an end and a tip. During use, the rakes slide across the box top while engaging the litter disposed therein. The teeth are inserted into the litter at each end of the box against the slanted end walls of the box by pressing the tips into the litter mass adjacent thereto. Then the rake ends are pushed inwardly until they reach the floor. The rakes then slide forwardly until the rake handle rests on top of the box frame. The rakes are then pushed simultaneously toward each other until reaching the box center while the debris in the litter is collected and pushed forward by the rake teeth while clean litter flows through gaps between the teeth. The rake teeth are horizontally spaced to permit the rakes to interlock when they meet to form a V-shaped chamber that captures the collected debris with a combined handle and a shield. When the interlocked rakes are lifted upwardly, all remaining clean litter falls free through the teeth while the chamber retains the collected debris. A barrier at one end of the chamber prevents debris from exiting while the other end forms an open waste removal port. The debris exits the chamber from the port when the obstructed end is tilted upwardly. The cleaning assembly may include a coupling for temporarily securing a bag to the port. After emptying the chamber, the rakes are separated, cleaned and stored. The base of the litter box may include an area for storing the rakes.

30 Claims, 11 Drawing Sheets

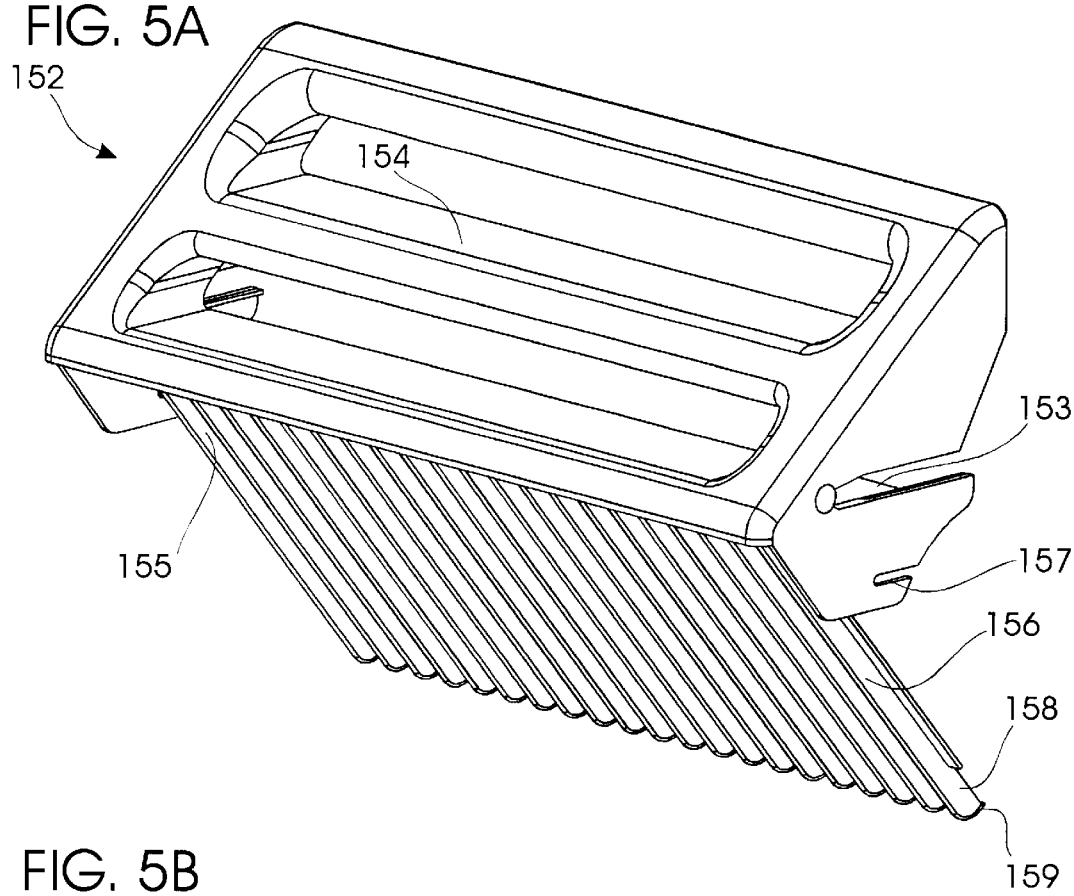
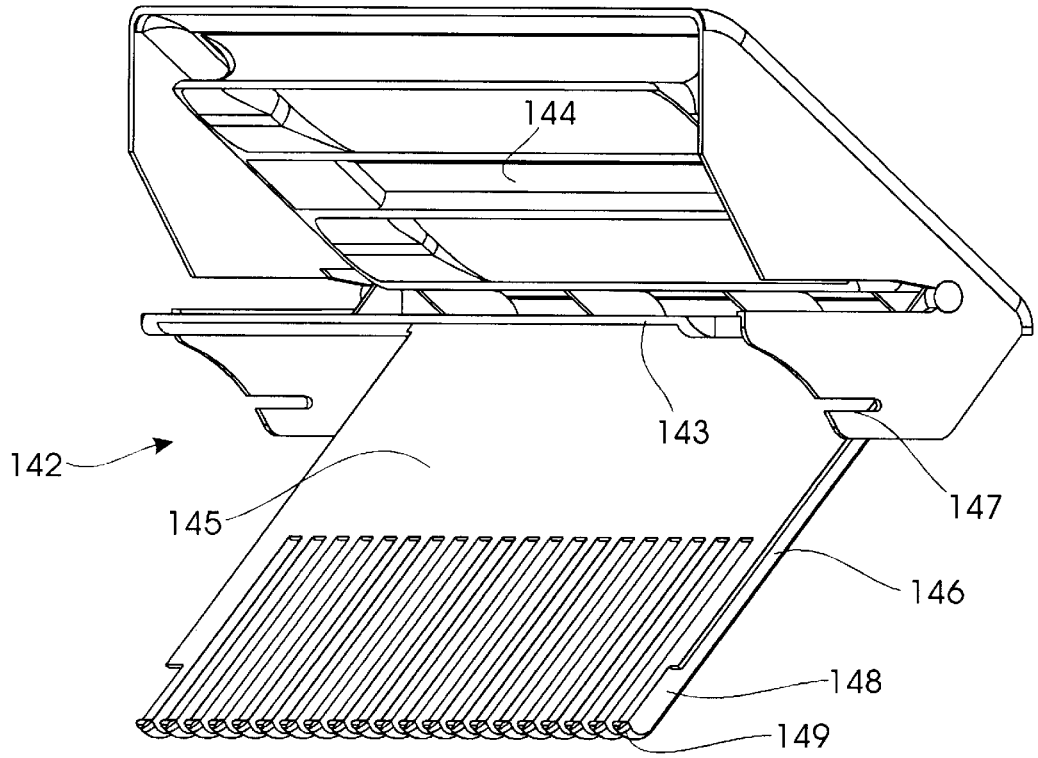

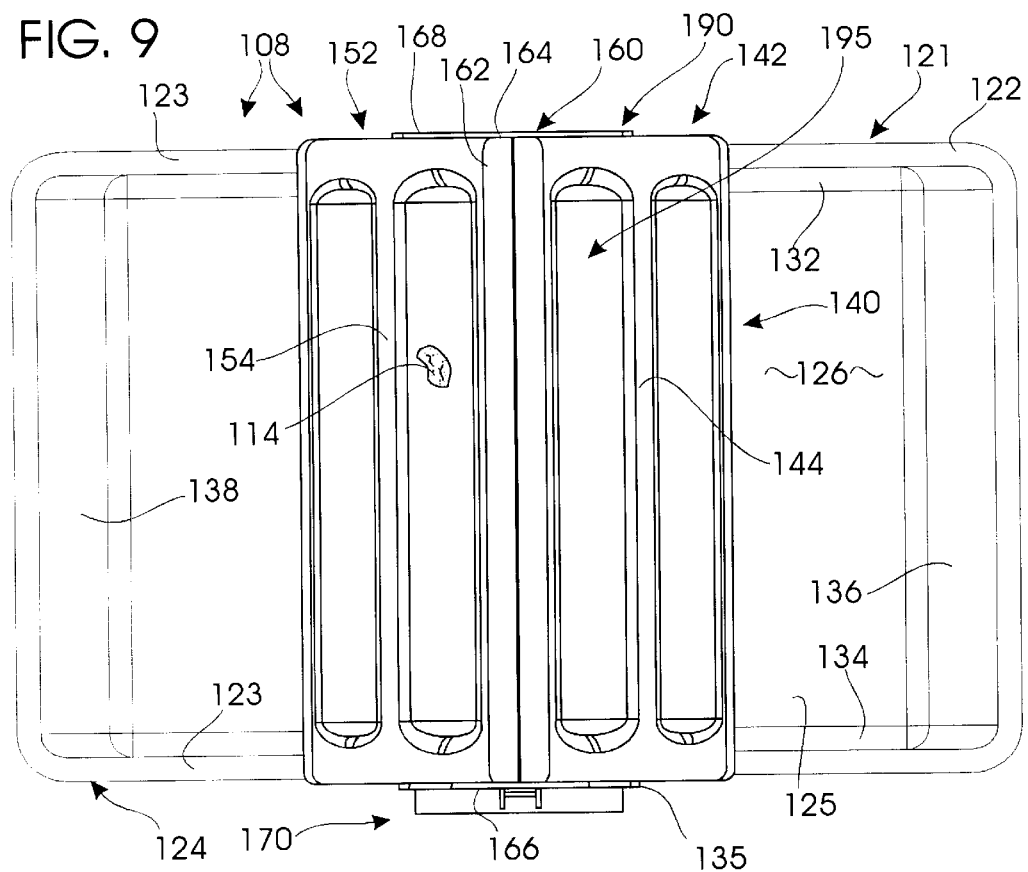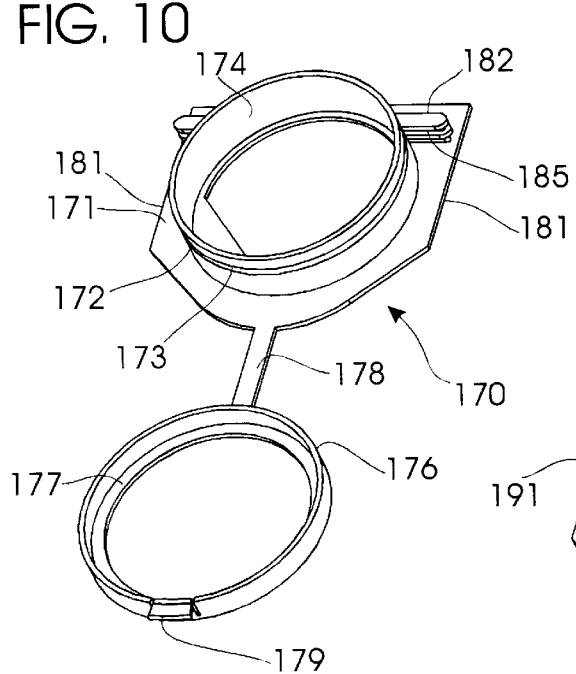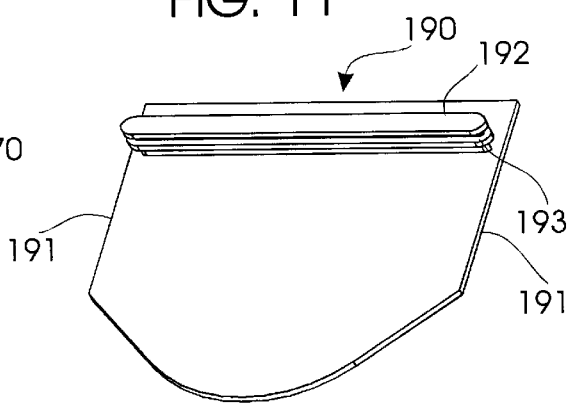

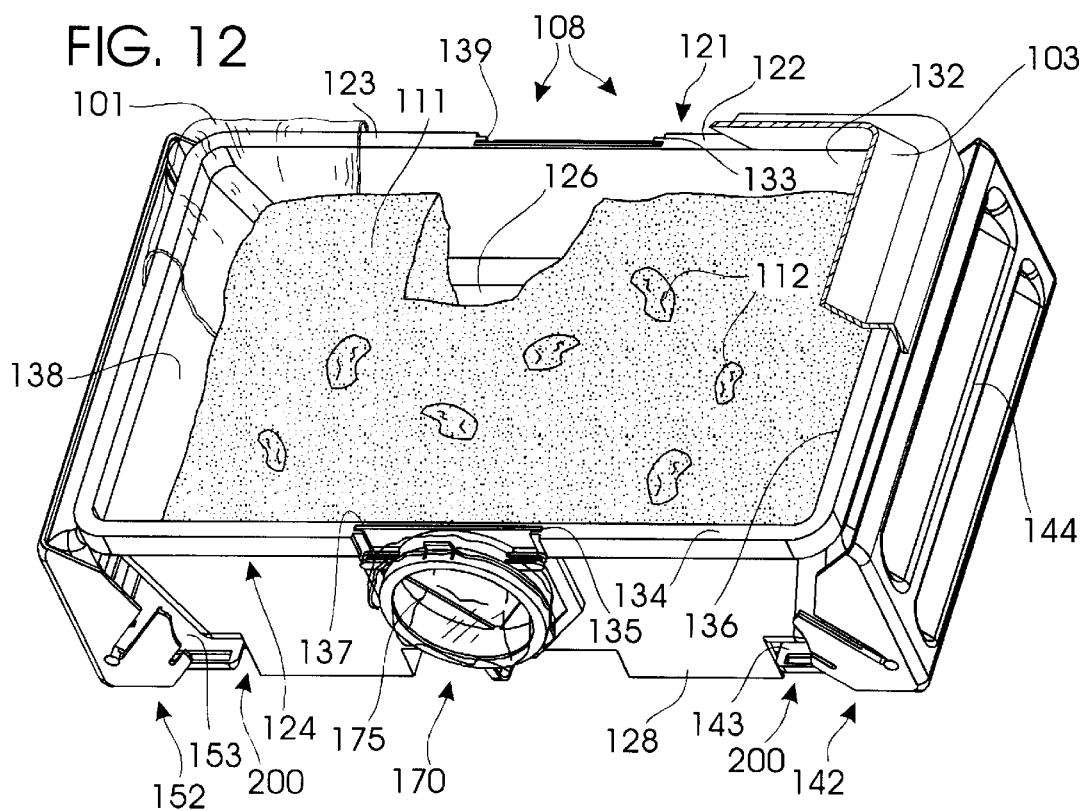
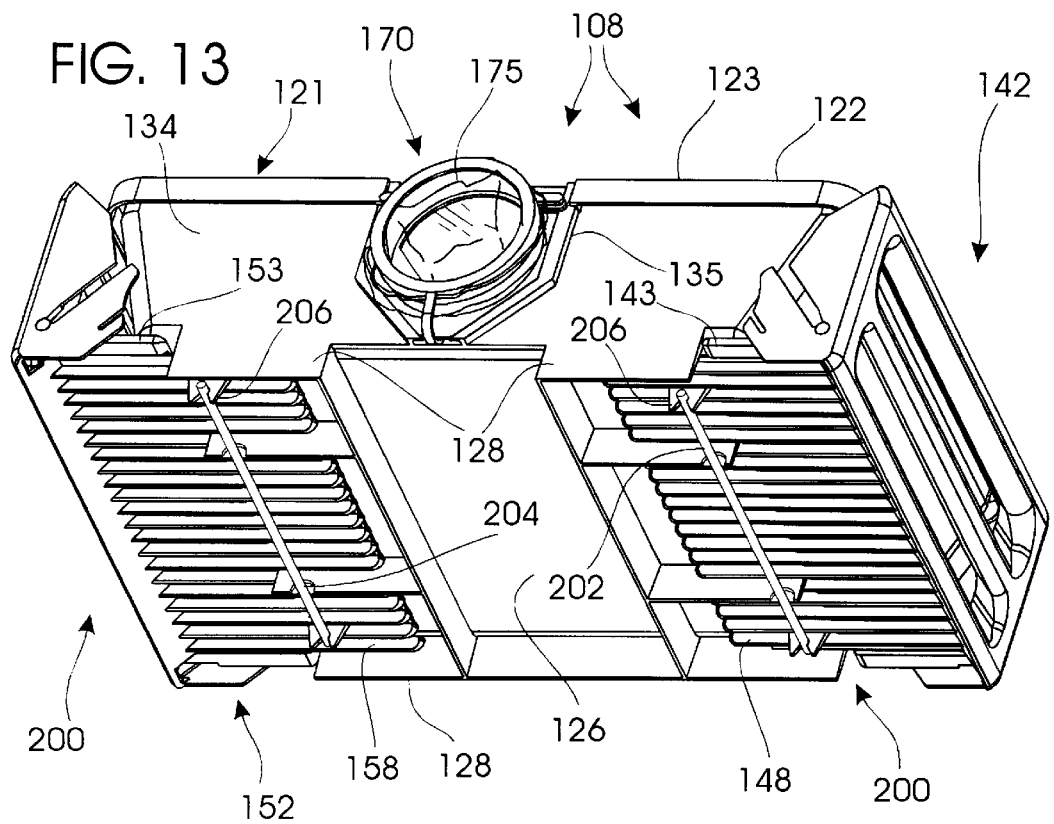

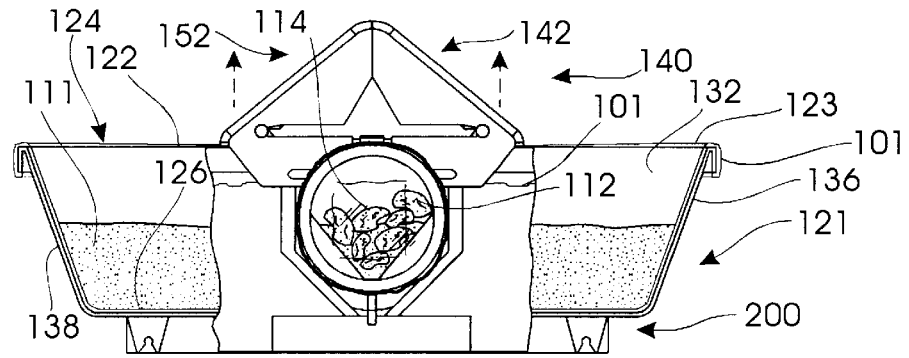
FIG. 18
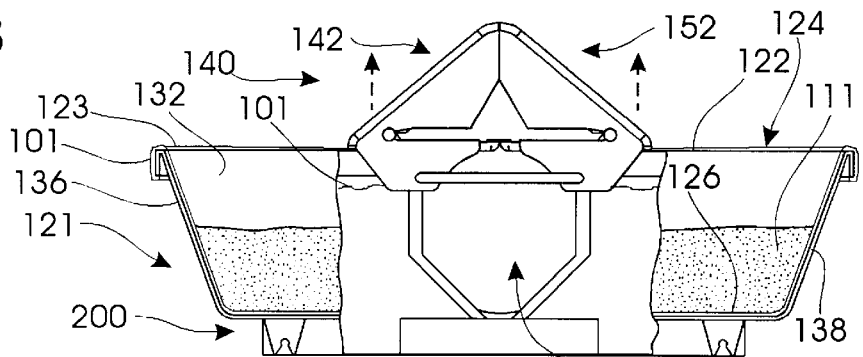
FIG. 19
FIG. 20
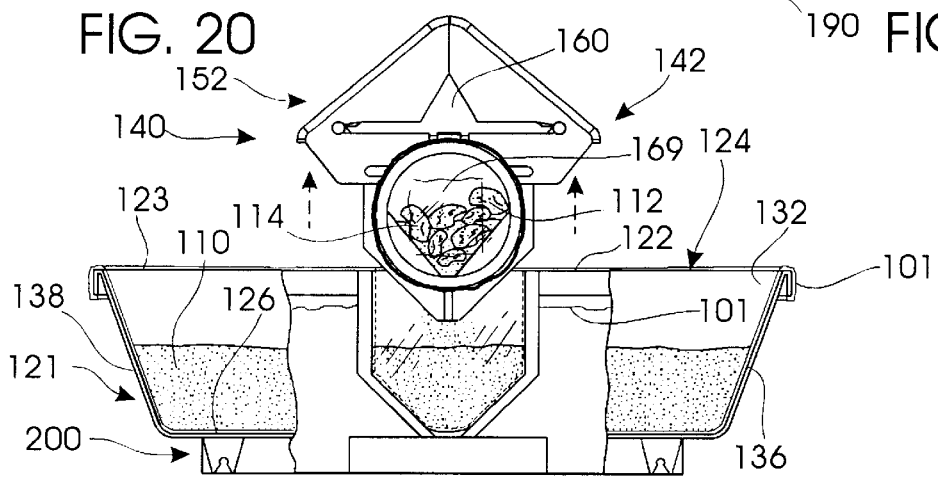
FIG. 21
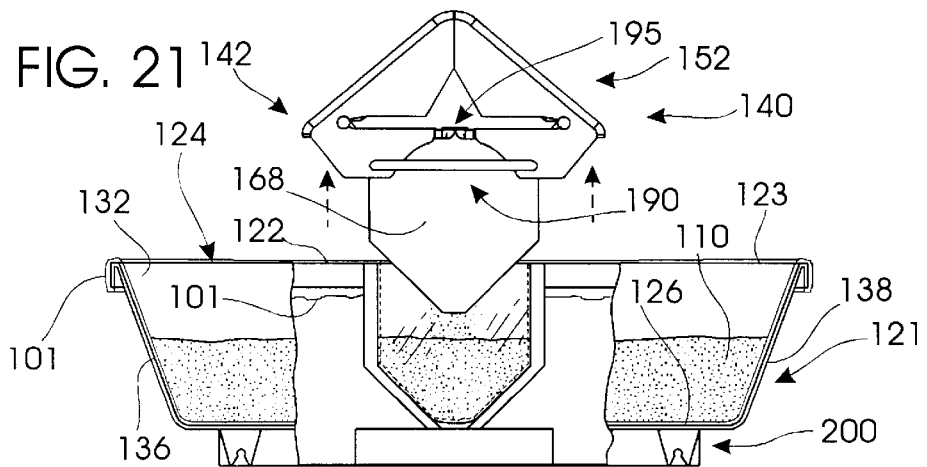

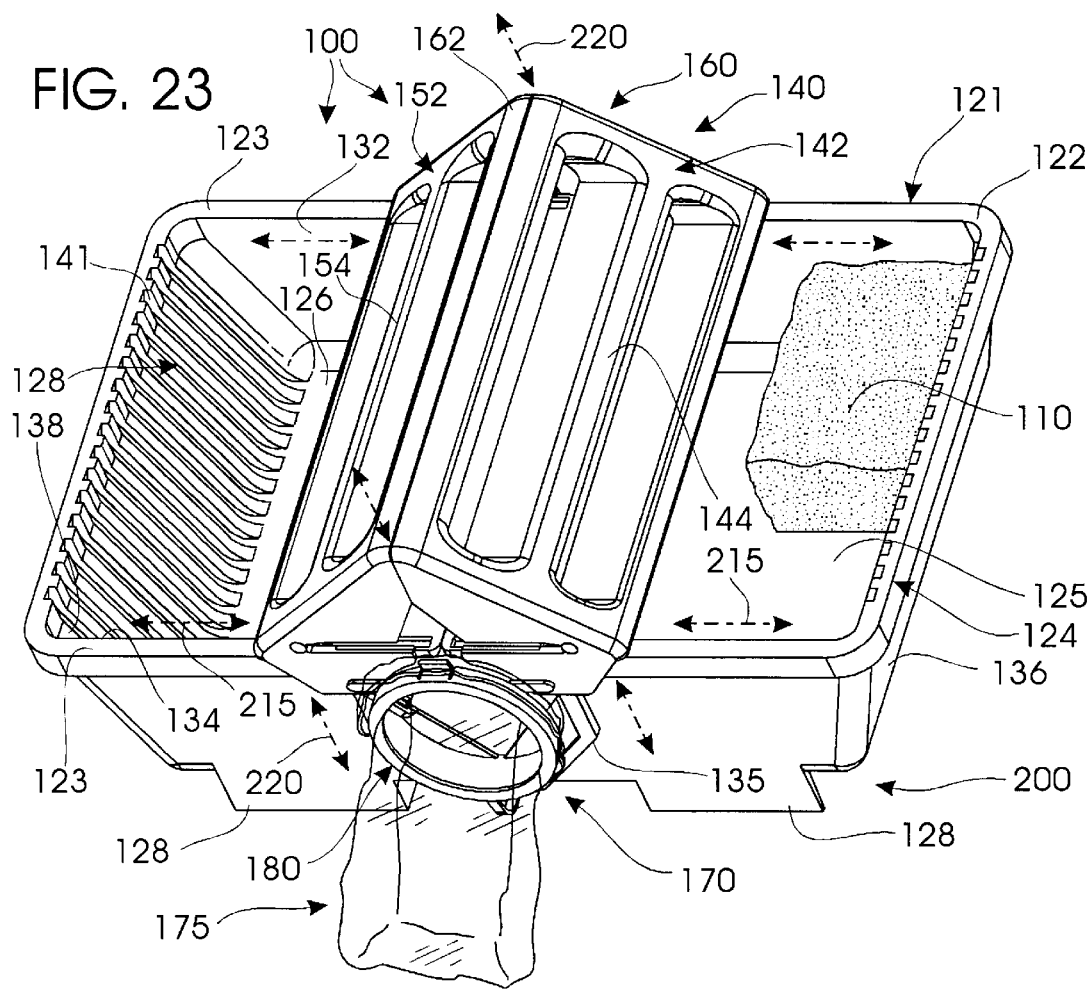

LITTER BOX CLEANING SYSTEM, COMPONENTS AND METHOD

CROSS REFERENCE TO RELATED APPLICATION

This application is a continuation-in-part of and priority is claimed to U.S. patent application Ser. No. 60/106,986 entitled Dual Rake Litter Box Cleaning & Maintenance System filed on Nov. 4, 1998.

BACKGROUND OF THE INVENTION

The present invention relates generally to receptacles for feline excrement (i.e., litter boxes for cats). In particular, the invention involves, a litter box cleaning system, an improved litter box and/or components thereof that in at least one embodiment provide a method for easily cleaning the litter in a litter box without undue effort, expensive equipment and/or special training.

As will be appreciated by those skilled in the art, a myriad of devices and systems have been proposed, conceived and manufactured to assist in the unpleasant process of cleaning feline litter boxes. To date, no known proposal has been completely satisfactory while many are prone to failure. The known art includes the following devices.

A device commonly referred to as a hand-held scoop has been used for many years. It is believed to be the original litter box cleaning device. The hand-held scoop is simple but inefficient. A user must search the litter box for clumps of waste, including feces and urine clumps, and then collect them in the scoop and transport them to a separate container for subsequent disposal. As will be appreciated by those skilled in the art, the use of a hand-held scoop can be both time consuming and unpleasant and often leaves hidden, unrecovered debris in the cleaned litter. The main advantage of the manual scoop is its practicality and very low cost per unit.

An improvement to the hand-held scoop is a bag that attaches to modified scoops for receiving wastes. This device is basically the same as the scoop (discussed hereinabove), except that collected debris is deposited in an attached bag through a collection tube in the rear of the scoop. However, this device suffers from many of the same shortcomings as the scoop. Moreover, this device is not inexpensive at $9.00 for the scoop and $3.00 per month for replacement bags.

A variety of sifting tray systems exist. These devices are sold under various names, including Lift n' Sift, Turbo Cat, Scoop-No-More, Van Ness, etc., and the most successful, Quicksand. Examples of these devices are also shown in U.S. Pat. Nos. 5,325,815, 5,823,137, 5,673,648, 5,799,610, 5,601,052, 5,785,000 and 5,577,462.

Typically, these devices employ a multiple tray structure wherein the upper tray is penetrated by a plurality of slots, slits or holes. The litter is cleaned by lifting the sifting tray to allow clean litter to fall through the slots, slits or holes while debris is retained in the lifted tray.

Another litter sifting product is a sifting liner. These devices are among the most practical of the conventional systems. The liners allow for keeping the box clean and protected from errant cat functions. The liners can be used with regular and clumping litters but not with natural litters. The liners are sanitary and efficient with good control of debris after sifting. However, these devices are not efficient for cats who dig aggressively. The cost of the liners is moderately high (approximately $37.00 to $72.00 per year).

While sifting systems can be relatively fast to use, they do require time and effort to reset them for subsequent use. They also suffer from several other drawbacks. For example, these types of litter systems are often heavy and difficult to manipulate. The litter sifter and litter mass (often weighing 8 to 12 lbs.), must be lifted during sifting and the sifted, cleaned litter poured back into another pan or the trays realigned and placed into another pan. This can be hard work for the person cleaning the box. The sifting action also creates needless dust and spillage.

Another difficulty is that many of these devices cannot utilize a litter liner to protect the pan from being soiled by the feline secretions. Further, many of these devices require hand washing, of the litter box which is generally a difficult, messy, and wholly unpleasant experience. Also, the slots, slits, or holes consistently become clogged with debris and often have to be manually cleared for efficient use. Spillage while changing the litter or disposing of the waste is also quite common. Finally, the exterior of the boxes of many of these devices are designed in a way that does not allow the use of a hood.

Some of these devices also require special clumping litter and they cannot use regular clay or other natural litters. As a result, while they are relatively inexpensive initially (on the order of $14.95 to 42.95 per unit), they are more expensive to operate in the long term than other devices.

Another common type of litter box is the self-cleaning, roll-over box or a combination screen and roll-over feature. Examples of this type are shown in U.S. Pat. Nos. 5,752,465, 5,509,379 and 5,622,140. These devices are often round in shape and they are typically self-contained. By rolling or turning the unit over and back, the feline excrements and other debris are captured in a tray for subsequent removal while the clean litter falls back into the box for use. These boxes can become quite nasty over time from soft wastes since no protection for the interior surfaces is possible. These devices are marginally expensive initially (only $39.95 to $69.95 per unit) but, again, they require special clumping litter and suffer from this disadvantage.

Another litter box improvement involves an automated or semi-automated self-cleaning feature (the brand Littermaid, for example). Examples can be seen in U.S. Pat. Nos. 5,477,812, 5,544,620, 5,267,530, 5,226,388, 5,048,464, 4,787,334, 5,048,465, 5,823,138 and 5,259,340.

In general, the automation of the cleaning feature of these devices is supposed to enhance their cleanliness. While these devices do have advantages, they also suffer from several problems. For example, the motorized devices are relatively loud during operation, which often scares cats, and its cleaning action can also frighten cats. Also, devices equipped with sensors are prone to failure caused when the sensors are covered by litter, dust, waste, etc. causing the unit to run constantly. Further, these devices typically cannot utilize a liner so that they require frequent cleaning. Unfortunate experience has shown that urine inevitably finds unreachable places and creates unpleasant odors. Another limitation is the storage capacity of the debris collector. Since it is limited, unattended use can cause an overflow. Also the initial cost of such devices can be quite high (approximately $200.00 per unit). Still further, these automated units use clumping litter only.

Thus, a need exists in the art for an improved litter box, system, components and/or method. Also, an improved system should be easy to empty and clean. An improved system should have components that may be easily disassembled for cleaning and sanitation.

SUMMARY OF THE INVENTION

The present invention is directed to a litter box, system, components and/or method utilizing a unique structure and function that addresses the need in the art. The present litter cleaning device also overcomes at least some of the problems experienced with the above referenced known systems.

In at least one embodiment, the present invention does not require lifting of the litter box or realignment of trays. This prevents unnecessary work, flying dust, and spillage. The debris is controlled and collected quickly and efficiently in an attachable, remarkable, disposable bag or sack with little or no mess or spillage. As a result, the invention is very fast and efficient to use and the entire litter mass in the litter box can be sifted or cleaned in less than 15 seconds.

In at least one embodiment, the present invention permits the use of a conventional, disposal litter box liner to protect the box from errant cat functions. The litter box of the present invention also allows for easy disposal of the soiled litter mass, leaving a completely clean box. The litter box, system, components and method of the present invention may also be fitted with a hood for odor control and cat security or privacy. The litter box of the present invention may also be used with clumping litter as well as some of the clay and natural litters, depending on granule size.

It is believed that the litter box, system, components and/or method of the present invention is equal or superior to all known devices in effectiveness, time consumption and ease of use. While some known or conventional devices may clean the litter, none are self-maintaining and it is a myth that self-cleaning litter boxes exist.

The litter box, system, and components of the present invention are quite sanitary as compared to other systems due to its ability to utilize a protective liner and its capability for disassembly for discrete cleaning and sanitation. This feature addresses a major shortcoming of many commercially available systems.

In accordance with one example of the method of the present invention only the bottom few inches of the rakes or combs come in contact with the litter and debris while all other surfaces are protected by a liner or stored away from the usage area of the box. The rakes or combs can be easily removed and cleared of debris and easily washed with soapy water and sanitized.

The box, system and components of the invention are also flexible in that they may be used with various litter types. Of the known art, only the manual scoop can be used to clean all litter types. The rakes or combs of the present invention also resists clogging by debris or the like and the method of collection is faster and more efficient than other systems. Also, the cleaning system, components and method of the present invention do not require lifting or pouring of full boxes of litter, during the litter sifting or cleaning operation thereby eliminating dust creation and spillage.

In one embodiment, the invention includes a litter box with an associated cleaning assembly that may be deployed with a conventional litter box or a litter box modified slightly to more efficiently deploy the cleaning assembly. In another embodiment, a disposable bag or sack coupling assembly may be employed with the cleaning assembly. In yet another embodiment, the litter box frame or base includes one or more storage areas for the cleaning assembly.

In one embodiment, the invention includes a litter box having a rectangular, box-like frame with an open top and a floor separated by four integral walls. The box or frame may be manufactured from any suitable material but it is preferably formed of polyethylene plastic. While the frame may have various dimensions, one example is approximately 20" in length, 13" in width, and 5" in depth. The side walls of the box are preferably vertically oriented with respect to the floor while the end walls slope outwardly from the floor at approximately 30 degrees. The box receives clean litter that is disposed along the floor of the box in a conventional manner.

The litter box employs a cleaning assembly for cleaning the litter disposed in the box. The cleaning assembly includes two cleaning or sifting combs or rakes. Each cleaning rake includes a handle with several spaced apart teeth that are preferably permanently attached but that may be removable. Each tooth has a terminal end with a tip that engages the litter.

During use, each of the rakes are moved from a respective end of the box toward the center of the box along the top of the box while having their teeth sifting or engaging the litter disposed in the box. The rakes or combs pass through the litter to remove fecal matter from natural litters and urine clumps from clumping type litter.

The rakes improve on the process of scooping a litter box with a small hand held scoop or the like (usually only 4–5 inches in width) by permitting the user to span the entire width of the litter box or pan, combing all the litter from end to end and side wall to side wall in a single pass of the rakes.

This structure has advantages over conventional structures. For example, the strategy of trying to comb an entire litter box from end to end with one rake is inefficient due to the amount of debris that is gathered through 16 to 20 inches of litter, 2 to 3 inches deep. The collected debris clogs the combs and subsequently resists allowing clean litter to flow through the comb gaps. Consequently, it is difficult to push a single rake through the entire length of the box, and if this is accomplished, at the opposite end of the box, there is a tidal wave of debris and clean litter pushed to the end wall, ending in a disastrous, uncontrollable mess.

This invention addresses this problem by attacking the soiled litter from both ends simultaneously, and dividing the raking task between two rakes or combs resulting in the efficient and controlled removal of waste and debris.

The litter cleaning process or method of the present invention is generally as follows. First, the rake teeth are inserted into the litter at each end of the box against the slanted end walls of the box. At this point, the tips are pressed directly into the litter mass adjacent to and against the sloped wall. Then the rake ends are pushed inwardly until they reach the floor of the box, approximately 2–3 inches deep into the litter. When the floor of the box has been contacted by the tips, the rake is then pushed horizontally forward until the rake and handle frame can rest on top of the box frame.

In another embodiment, side runners attached to the rakes and corresponding slots in the outside walls of the box guide the rake teeth as they enter the litter and subsequently move through the box, until the completion of the litter cleaning process. In all embodiments, following this procedure cleans the first few inches of soiled litter adjacent the end walls.

Next, the rakes are pushed simultaneously, or individually toward each other until reaching the center of the box. As the rakes move toward the center, the debris contained in the box is pushed forward by the rake teeth while clean litter flows through gaps between the teeth.

As the rakes near one another, a unique feature of the device or assembly becomes very apparent. Due to the angle at which the rakes are aligned preferably (approximately 40 degrees from vertical) and the horizontal spacing of their teeth (alternating across the width of the rakes), when the rakes are pushed forward, the teeth of each rake meet and pass through each other to interlock. This interlocking action of the teeth forms a V-shaped chamber, and the collected debris that has been pushed together by the first two process steps is now captured inside this V-shaped chamber. In at least one embodiment, each rake is designed so that above the teeth, the frames of the two rakes meet, centered directly over the V-shaped chamber, and this union forms a combined handle.

With the two rakes now interlocked in the box, and with their respective handles joined, the remaining few inches of soiled litter in the box have been cleaned along with the previous debris collected between the rakes. A unique feature of the interlocking of the rake teeth is that, as the rake teeth pass through each other, the debris is lifted upward by the interlocking action. This leaves very little clean litter remaining in the collection chamber and subsequently reduces the possibility of dust creation from the cleaning process. The process continues by grasping the handle and lifting the two interlocked rakes up and out of the box, allowing the remaining clean litter to fall free through the teeth and into the box. The V-shaped chamber now holds all of the collected debris securely within the interlocked teeth. The debris is subsequently removed from the rakes by tilting the rakes and dumping the debris in a trash can or a disposable bag releasably coupled to one to end of the rakes.

A barrier at one end of the rakes or chamber prevents debris from exiting at the obscured end. In one embodiment, a disposable bag is held adjacent the other end of the chamber to receive wastes exiting a waste portal. The bag receives wastes when the user tilts the opposite end upwardly to gravitationally feed the debris in the chamber into the bag. The debris is collected by simply turning this end downward to allow the debris to fall into the awaiting collection bag. This procedure can also be followed without a bag if the user would prefer to dispose of the waste, in a controlled manner, into a receptacle, toilet, or the like. The two rakes are then separated (cleaned if necessary) and stored for their next use.

In another embodiment, the centrally located waste removal port includes a bag coupling assembly that permits the collected wastes to be conveniently removed from the box. The bag assembly includes a disposable bag and coupling attachment for securing the bag thereto. The bag receives the collected waste for subsequent disposal.

In yet another embodiment, for easy storage of the rakes, the base of the litter box is adapted to receive the rakes for storage. The teeth or rake frame can be inserted into apertures in the ends of the box base and the handles secured to the exterior box walls, forming one convenient and functional unit.

Thus, a principal object of the present invention is to provide an improved litter box, cleaning system, components and/or method for cleaning used litter.

An object of the present invention is to provide a fast, efficient, sanitary, and cost effective means for removing debris and waste from a cat litter box while eliminating shortcomings associated with previous litter cleaning proposals.

Another object of the present invention is to provide an improved litter box system, components, or the like that minimizes maintenance.

Another object of the present invention is to provide an improved litter box, system, components, or the like that may be quickly cleaned while maintaining sanitary conditions.

BRIEF DESCRIPTION OF THE DRAWINGS

FIG. 5A is an outer perspective view of one rake of the cleaning assembly of FIG. 1;

FIG. 5B is an inner perspective view of the other rake of the cleaning assembly FIG. 1;

FIG. 9 is a top plan view of the embodiment of FIG. 7 with the bag removed;

FIG. 10 is a front perspective view of the waste removal port of FIG. 7;

FIG. 11 is a front perspective view of the obstruction wall of FIG. 9;

FIG. 12 is a perspective view, taken generally from above, showing the litter box of FIG. 7 with the rakes of the cleaning assembly in a storage deployment beneath the box;

FIG. 13 is a front perspective view, taken generally from below, of the embodiment of FIG. 12 showing the rake storage areas;

FIG. 18 is a partially fragmented cross-section side view showing the third litter cleaning step using the invention embodiment of FIGS. 7–13;

FIG. 19 is a partially fragmented cross-section side view showing the other side of the litter box of FIG. 18;

FIG. 20 is a partially fragmented cross-section view showing the fourth litter cleaning step following the third step of FIGS. 18 and 19; and, FIG. 21 is a partially fragmented cross-section view showing the other side of the litter box of FIG. 20;

FIG. 23 is a partial perspective view of a modified litter box.

DETAILED DESCRIPTION OF THE PREFERRED EMBODIMENTS

Figure 1:
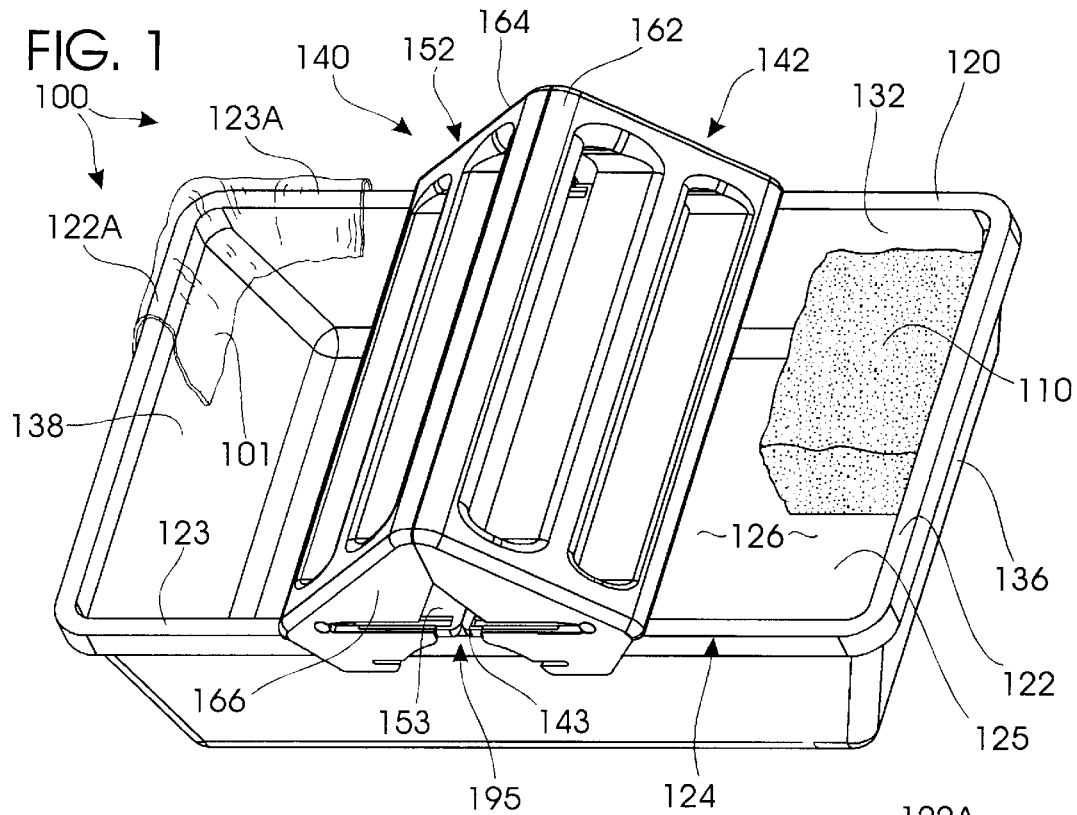
FIG. 1 is a perspective view, taken generally from above, of one embodiment of the invention, showing the litter box with an associated cleaning assembly in an operative deployment on the box.

With reference to FIGS. 1–6 and 14–17 the drawings, an improved litter box system in accordance with one embodiment of the present invention is generally designated by reference numeral 100. The system 100 addresses the need in the art for an improved litter box and cleaning system. The system 100 does not require lifting of the litter box or realignment of sifting trays to clean the litter 111 in the litter box. Moreover, the system 100 does not cause unnecessary or unsanitary conditions resulting from flying dust, spillage, or the like.

The system 100 facilitates disposal of soiled litter, waste, debris, clumps, and the like while leaving completely cleaned litter 110 (raked or combed) in the box. The system 100 includes a litter box 120 and cleaning assembly 140 deployed by a user to clean used litter 111 to remove waste materials 112 therefrom. During the cleaning process, the waste materials 112 are controlled and collected both quickly and efficiently. The collected wastes 114 are then, for example, deposited into a disposable plastic bag, paper sack, or another appropriate receptacle with substantially no mess or spillage. As a result, the system 100 is very fast and efficient to use and the entire litter mass 110 can be cleaned in less than 15 seconds.

The litter box 120 of system 100 may also be used in conjunction with a disposable protective liner 101 to maintain the sanitariness of the litter box. A conventional or modified disposable plastic, paper or cardboard litter liner 101 protects the box from undue contamination resulting from excessive digging, errant excretions or other poor toiletry habits of messy cats. The litter box 120 of system 100 may also be fitted with a conventional or modified litter box hood 103 for odor control (FIG. 12). The system 100 may be used with clumping type litter as well as some of the clay or natural litters, depending on granule size. The system 100 also resists clogging by waste or other debris or the like while promoting a method of waste collection that is faster and more efficient than conventional systems. Moreover, the ability to disassemble the system 100 into discrete components further promotes cleaning and sanitation.

In the exemplary embodiment of FIGS. 1–6, the system 100 includes litter box 120 and associated cleaning assembly 140. The litter box 120 may either be of conventional design or specifically adapted for use with the cleaning assembly 140. In another embodiment of the present invention shown for example in FIGS. 7–13 and 18–21 of the drawings, a central waste portal 170 permits the user to temporarily couple a disposable bag 175 to a modified litter box 121 for use with the cleaning assembly 140. In yet another embodiment of the present invention as shown in FIGS. 7–21 of the drawings, the litter box 120 or box 121 includes storage areas 200 for the cleaning assembly 140.

In the exemplary embodiment of FIGS. 1–6, the litter box 120 has a rectangular, box-like frame 122 with an open top 124 and a floor 126 bounding an interior 125. As shown in FIGS. 14–17 of the drawings, the litter box 120 may be modified to include feet 128 and storage areas 200. Of course, other conventional litter box designs could be used as well if desirable with the cleaning assembly 140 modified to fit with the litter box as necessary. Top 124 and floor 126 of the litter box 120 are separated by four integral walls 132, 134 (the sides), 136 and 138 (the ends). As with other conventional litter boxes, the box 120 receives and retains clean litter 110. Litter 110 is typically disposed along the floor 126 of the box 120 in a conventional manner suitable for subsequent use by a feline or other pet or animal.

The litter box 120 may be manufactured from any suitable material but it is preferably formed of polyethylene plastic. While the frame 122 may have various dimensions, one particular example is approximately 20" in length, 13" in width, and 5" in depth. The side walls 132 and 134 of the box 120 are preferably substantially vertically oriented with respect to the floor 126 while the end walls 136 and 138 slope outwardly from the floor 126 at approximately 30 degrees. However, sloping end walls are not necessary to practice the invention.

Preferably, the side walls 132 and 134 are topped by rails 123 of frame 122 that support the cleaning assembly 140 during use. Rails 123 may be formed of polyethylene plastic as well and are preferentially slightly thicker than the side walls 132 and 134 although this is not required.

With reference to the exemplary embodiment of FIGS. 7–13 and 18–21 a receiver 133 is defined in wall 132 of litter box 121 and a receiver 135 is defined in wall 134 of litter box 121 to facilitate the use of a waste portal 170 and obstructing panel 190 as will be more thoroughly discussed hereinafter.

The litter box 120 employs a cleaning assembly 140 for cleaning the soiled litter 111 and waste 112 disposed in the box 120. The cleaning assembly 140 includes two cleaning combs or rakes 142 and 152. When the rakes 142, 152 are joined as shown in FIGS. 1–3, 7–9 and 16–21 they form a unitary disposal chamber 160 that is used for collecting and disposing wastes 114.

Each cleaning rake 142, 152 includes a handle 144, 154 with a rack 145, 155 that mounts several spaced apart teeth 146, 156. In one exemplary embodiment, each tooth 146, 156, is approximately 4 inches in length and a quarter inch in width. The teeth 146, 156, are offset and spaced to interlock as will be discussed later. Each tooth 146, 156 has a terminal end 148, 158 with a tip 149, 159 that engages the litter 110. Preferably, the teeth 146, 156 are permanently mounted but not necessarily so. The teeth 146, 156 may be formed from plastic or metal or wood. They may be cylindrical, triangular or other acceptable shapes as well.

During use, the rakes 142, 152 slide along the top of rails 123 of the box 120 or box 121 while the teeth 146, 156 engage the soiled litter 111 disposed in the box 120. The teeth 146, 156 of rakes 142, 152 comb through the litter 111 to remove wastes 112, including fecal matter and urine clumps from the litter 111 (which may be regular clay and/or natural litters with respect to the fecal matter and/or clumping type litter with respect to the urine clumps). The flat face of the teeth facilitates filtration of soiled litter and collection of wastes.

The rakes 142, 152 permit the user to span the entire width of the litter pan, combing or raking all the litter from end to end and side wall to side wall in a single pass. In use, only the bottom few inches of the teeth 146, 156 of rakes or combs 142, 152 come in contact with the litter 111 and debris 112 while all other surfaces are protected by a disposable liner 101 or located away from the usage area of the box (generally the interior 125).

Normally, the rakes 142, 152 may be removed from the box 120 for cleaning. In one embodiment, the racks 145, 155 are removable from the rake 142, 152 or each tooth 146, 156 may be removable from its respective rack 145, 155. Thus, the combs or rakes 142 and 152 can be easily disassembled, cleared of debris for subsequent washing with soapy water, in a dishwasher, or the like. As a result, the removable components (and litter box) may be easily cleaned and sanitized for preserving sanitary litter box conditions.

Figure 1A:
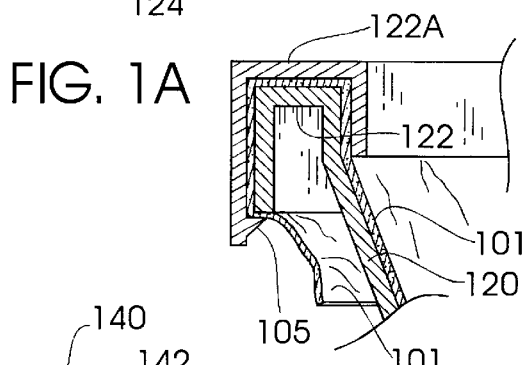
FIG. 1A is an enlarged partial cross-section of the frame, liner, and outer frame of one embodiment of the litter box of FIG. 1.

The liner may be further altered to allow the free movement of the portal and obstructing wall/panel. This alteration would be comprised of cutting slots in the liner where the plastic would obstruct the vertical removal and replacement of the portal and back construction wall/panel. The disposable plastic, paper or cardboard liner 101 in FIG. 1 may be held in position over frame 122 of box 120 by, for example, an elastic band, tape, or other releasable securing means, or alternatively, by an additional or outer frame 122A having rails 123A and adapted to fit over liner 101 and frame 122 of litter box 120 (FIG. 1A).

As mentioned previously, when the rakes 142, 152 are joined, they form a unitary disposal chamber 160. Chamber 160 includes a central handle 162 formed by the tops of handles 144, 154. The chamber 160 forms an elongated, hollow, generally v-shaped collection area 165 extending between spaced apart ends 164 and 166. The area 165 holds the collected wastes 114 until subsequent disposal, as will be more thoroughly discussed hereinafter. One end 164 is preferably closed off or obstructed by a retaining wall or obstructing wall or panel 168. The retaining wall 168 may be integrally formed on either rake 142, or 152 (FIG. 4), it maybe half on each rake 142, 152 (FIG. 14), and/or it may be selectively coupled thereto, as will be discussed hereinafter. The other chamber end 166 forms an open exit or disposal port 169. The collected wastes 114 may be dumped through the disposal port 169 in a controlled manner. With the rakes or combs 142, 152 pushed together, the collected waste 114 located in the collection area 165 and the teeth 146, 156 being intertwined or interlocked, the cleaning assembly 140 may be carried with one hand using combined handle 162 to carry the collected wastes 114 to a disposal container, area or the like without spilling litter, debris, waste, or the like while carrying the cleaning assembly 140 by simply tilting the cleaning assembly 140 so that the waste 114 moves away from disposal port 169. Hence, the cleaning assembly 140 provides a very efficient, effective, sanitary waste disposal, waste remover and disposal unit which is relatively light weight, easy to maneuver, and which can be held in one hand to allow the user to use the other hand to, for example, open the lid on the trash can.

Also, when not in use, the cleaning assembly 142 can be stored in a plastic bag, paper sack, box, or the like in a cabinet, on a shelf, under a sink, hung on the wall, or the like. Further, each rake 140 and 152 can be, for example, stored by being placed on a hook on the back of a cabinet door, on a utility room wall, on a garage wall, in a cupboard, or the like. With reference to FIGS. 7, 8, 9, and 12–21 of the drawings, the rakes 142 and 152 may be stored on the ends of the litter box 120 or 121. Also, although not preferred, the rakes may be stored at the edges of the litter box, for example, as shown in dash lines in FIG. 2, or may be stored together at one or the other end of the litter box, if the cat or pet using the litter box is relatively clean and not too finicky. It is preferred to remove the cleaning assembly 140 from the litter box 120, when the cleaning assembly 140 is not in use, so that the cat or other pet using the litter box has full access to the litter box, does not get the exterior of the rakes dirty, a hood can be placed over the litter box, and the like.

It is preferred that the rakes 142 and 152, and the litter box 120, and other components be formed of a lightweight sturdy plastic material which can be formed in any desired color, pattern or the like to satisfy the purchaser or user. For example, conventional litter boxes are formed in gray, blue, black, white, brown and the like. In order to maximize the aesthetic quality of the system 100, it is preferred that the rakes 142 and 152 have the same color as the litter box 120 to provide a monochrome appearance to the system 100. As the cleaning system 140 and the right and left hand rakes 142 and 152 may be sold together and/or separately from the litter box 120, depending on the particular taste of the user, purchaser, or the like, they may choose to purchase a litter box 120 having a different color than the cleaning system 140 and may further choose to have each rake 142 and 152 be of different colors. Further, disposable litter box liners 101 are usually clear or white plastic material but may be made of the same colors as the litter box 120 and cleaning assembly 140. Still further, the outer or overlying frame 122A is preferably formed of the same color and material as the frame 122 of litter box 120. The overlying frame 122A may also include nubs, bumps, catches or the like 105 in order to releasably hold the frame 122A in position over liner 101 and litter box frame 122 while in use. Further, the outer frame 122A can be a single rectangular frame or formed of two or more separate pieces. It is preferred that the hood 103 have a base which accommodates the outer dimension of frame 122 and outer frame 122A. Consequently, the frame 122 may have slightly smaller outer dimensions than a conventional liter box so that when outer frame 122A is placed thereover, the hood 103 fits onto the outer frame in a conventional manner. Alternatively, it is contemplated that a modified or custom hood 103 be used which accommodates litter box 120, box 121, frame 122, frame 122A, and the like.

In the exemplary embodiment of FIGS. 7–13 and 18–21, system 108 includes a litter box 121, cleaning assembly 140, portal 170 and obstructing panel 190. The central waste portal 170 permits the user to temporarily couple a disposable bag 175 to the litter box 121 for use with the cleaning assembly 140. Preferably, the waste portal 170 couples to the assembly 140 adjacent the disposal port 169 while an obstructing wall or panel 190 couples to end 164. It is preferred that waste portal 170 and obstructing panel 190 have substantially identical outer dimensions so that the waste portal 170 and obstructing panel 190 can be received by either end 164 and 166 of cleaning assembly 140 and be received in either receiver 133, 135 on the sides of the litter box 121. Although it is preferred to use both the waste portal 170 and obstructing panel 190, it is contemplated that one may use the cleaning assembly 140 with just the obstructing panel 190 at one end 164 or 166. The waste portal 170 utilizes receiver 135 while the obstruction wall 190 that forms wall 168 utilizes receiver 133.

The waste portal 170 includes a frame 171 with a raised round port 172 with a central opening 174. The bag or sack 175 is disposed over opening 174 while a retention ring 176 fits over the bag 175 and opening 174 and around a recessed lip 173 in port 172 (as indicated by arrow 180). A flexible hinge or strap 178 secures the ring 176 to the port 172 while a tab or catch 179 facilitates manipulation of ring 176. In a particular embodiment, portal 170 slides into a groove 137 in cavity 135 via sides 181 on frame 171 and a raised coupling bar 182 enables the portal 170 to couple with rakes 142, 152. The raised bar 182 defines a grooved flange or tongue 185 that fits into grooves or slots 147 and 157 in each end of rakes 142 and 152, respectively.

The obstruction wall or panel 190 also forms the retention wall or panel 168. The wall 190 slides into a groove 139 in cavity 133 via sides 191 on wall 190 and a raised coupling bar 192 enables the wall 190 to couple with rakes 142, 152. The raised bar 192 defines a grooved flange or tongue 193 that fits into grooves or slots 147 and 157 in each end of rakes 142 and 152, respectively.

In the exemplary embodiment of FIGS. 7–9 and 12–21, the litter box 120 and box 121 include a storage areas 200 on the bottom of floor 126 for storing rakes 142 and 152 of the cleaning assembly 140 when it is not in use. Each of the storage areas 200 is formed by a recessed area under the floor 126 formed by supports or legs 128. Ideally, each area 200 is sufficiently wide and deep enough to fully accommodate the rack 145 or 155 of either rake 142 or 152 when they are not in use. The racks of rakes 142 and 152 simply slide under the box 120 adjacent sides 136 and 138 respectively. Removable metal or plastic rods 202 and 204 may be placed in rod holders 206 to keep the teeth 146 and 156 of rakes 142 and 152 from touching the floor.

As mentioned previously, the base of the litter box 120 thus receives the rakes 142, 152 for storage. It is to be understood that the teeth and/or rake frame could be inserted into slots or apertures in the ends of the box base and the handles secured to the exterior box walls to form one convenient and functional unit.

Operation

Figure 2:
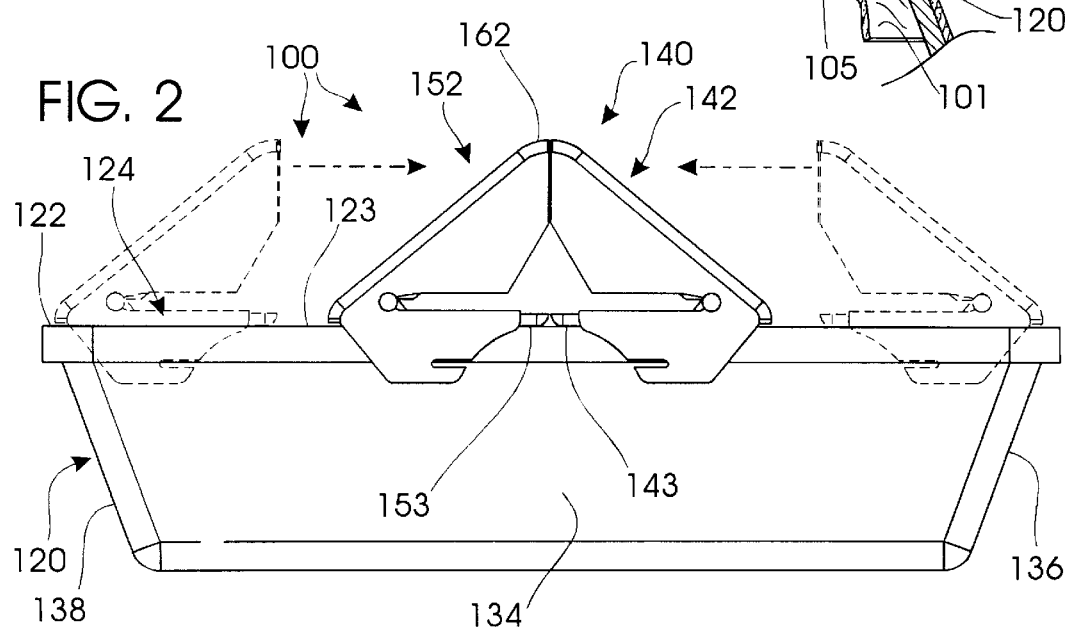
FIG. 2 is a side elevational view of the embodiment of FIG. 1.
Figure 3:
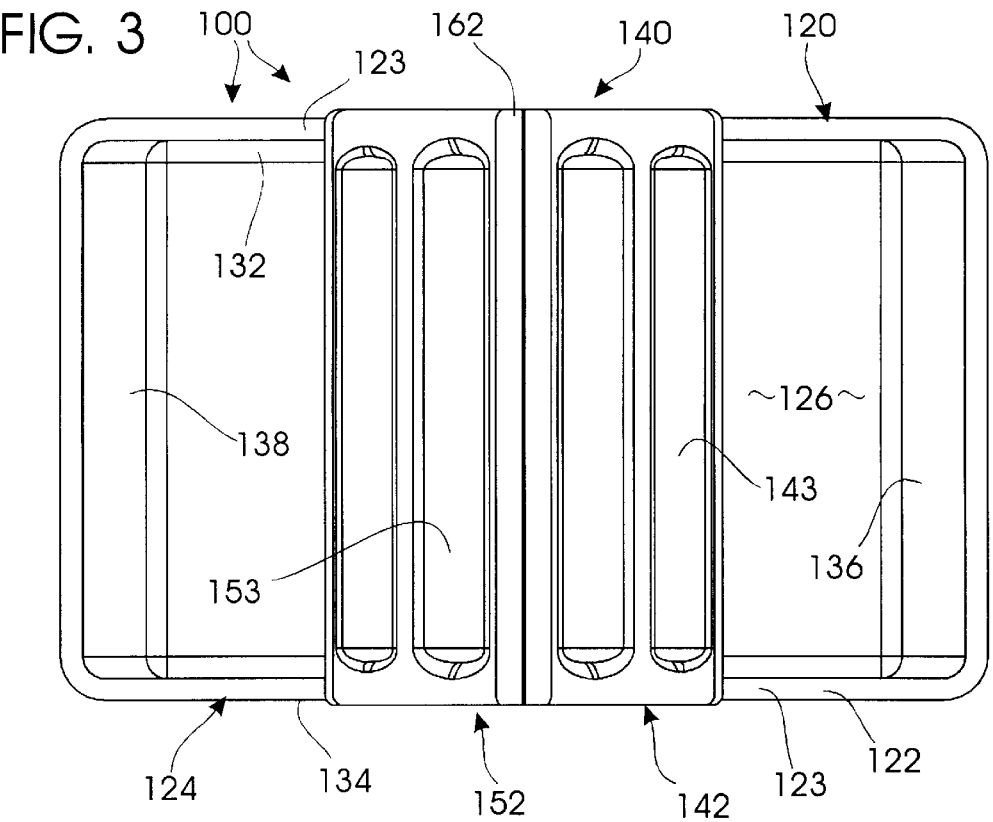
FIG. 3 is a top plan view of the embodiment of FIG. 1.
Figure 4:
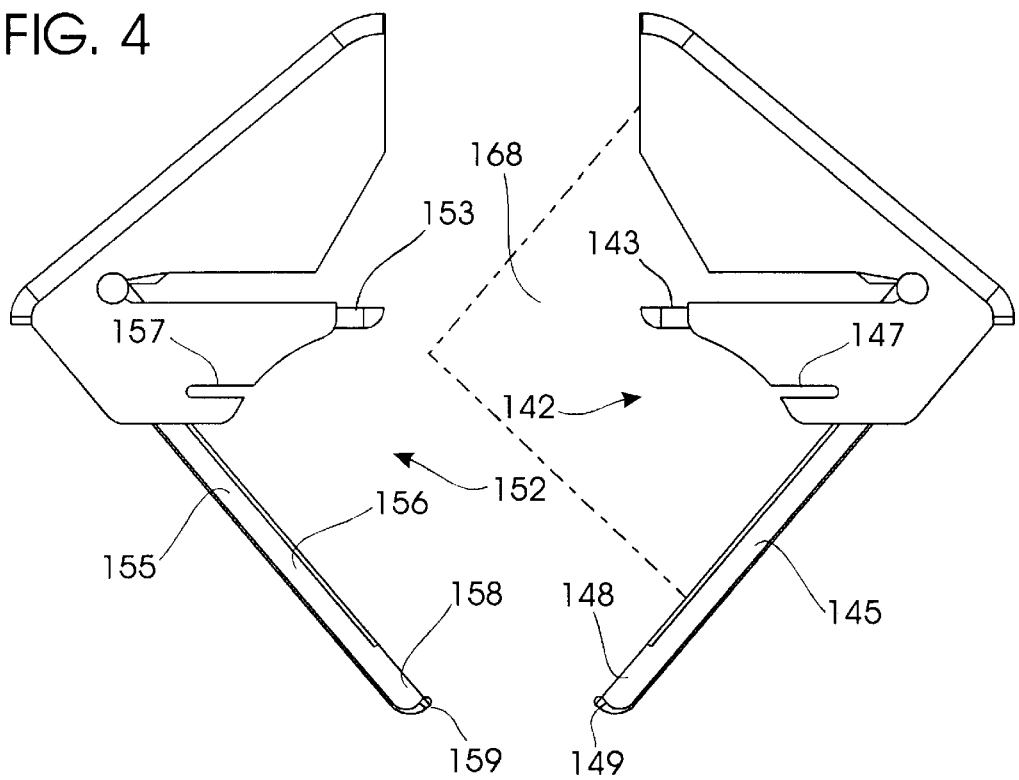
FIG. 4 is an end plan view of the cleaning assembly of FIG. 1 with the rakes separated.
Figure 6:
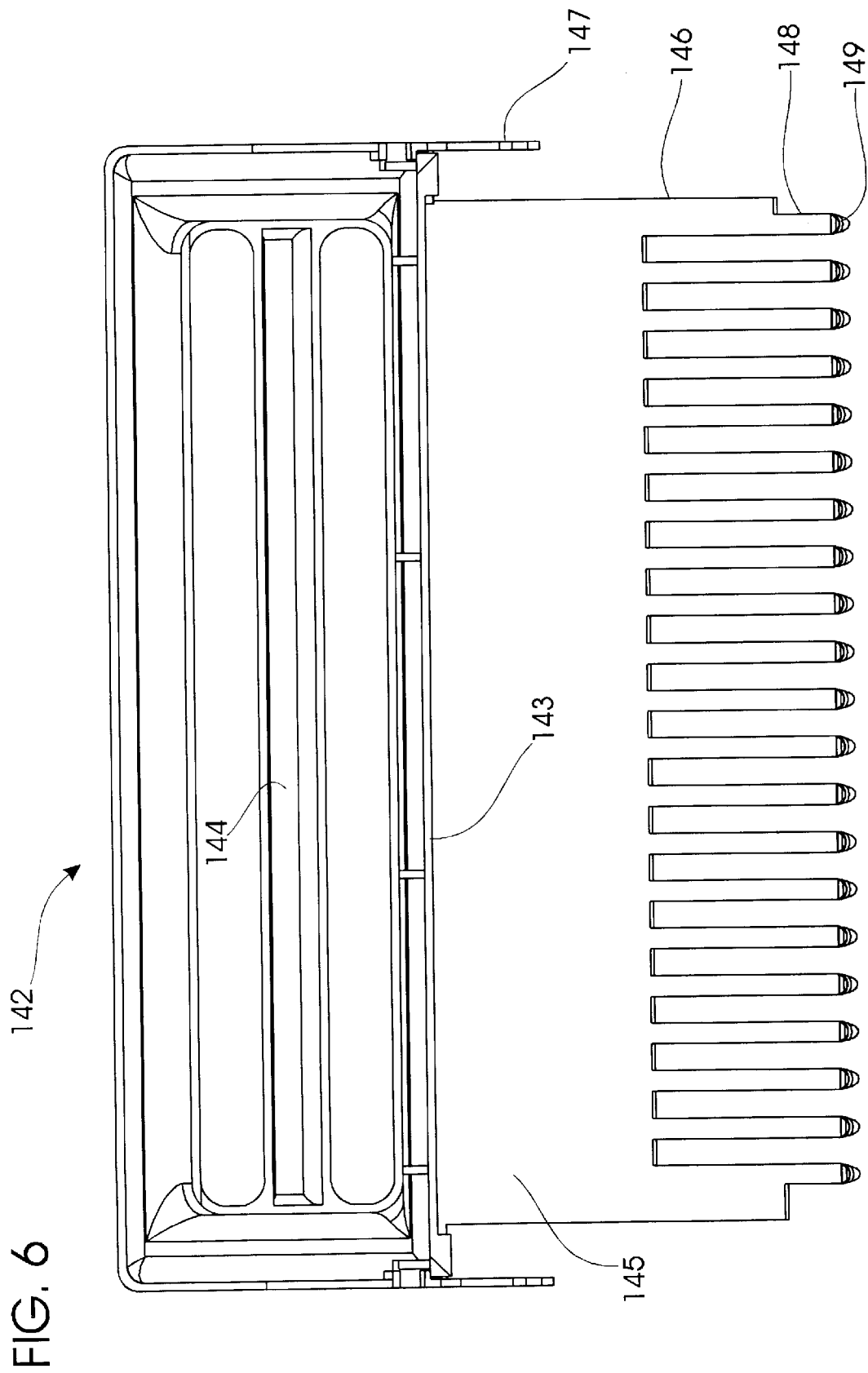
FIG. 6 is an elevational view of the interior of the rake of FIG. 5B.
Figure 7:
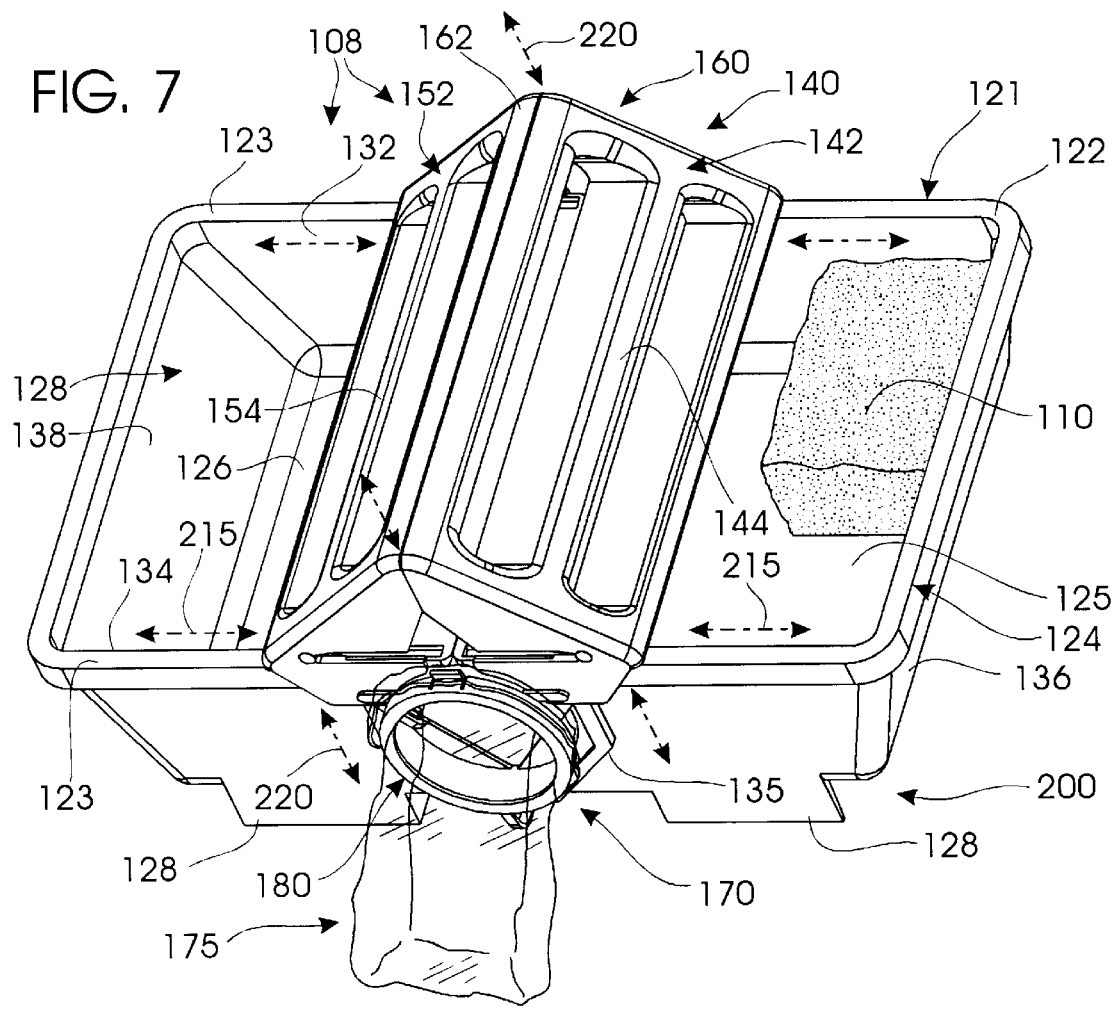
FIG. 7 is a front perspective view, taken generally from above, of another embodiment of the invention, showing the litter box with an associated cleaning assembly in an operative deployment on the box and coupled to a waste removal port and bag.
Figure 8:
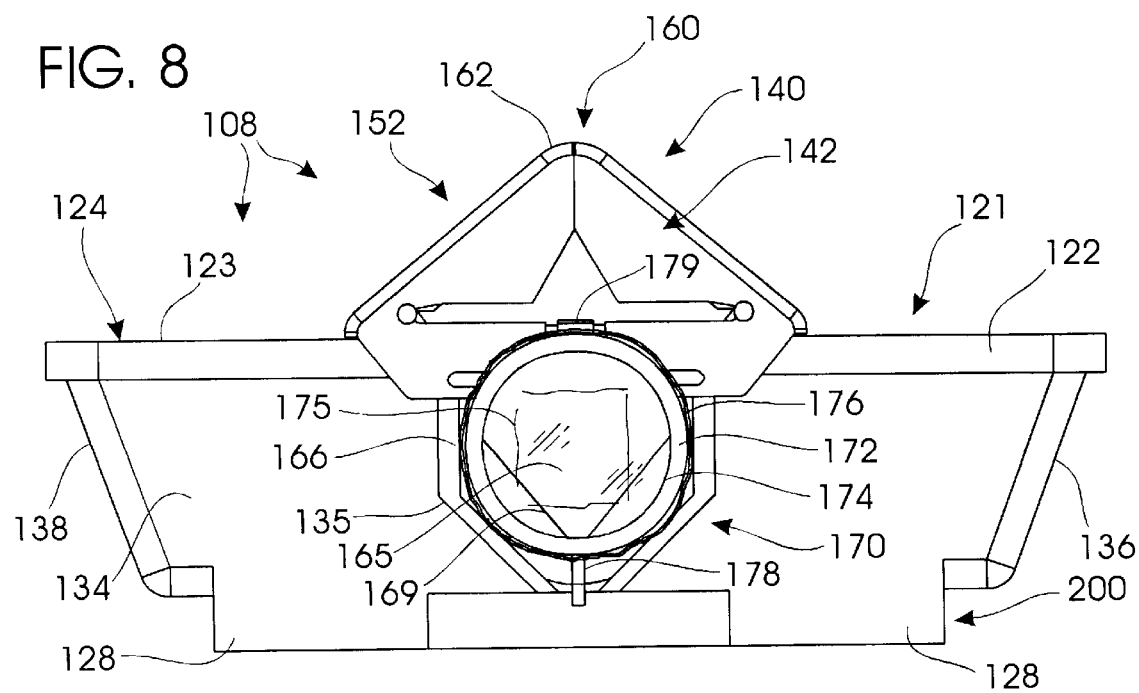
FIG. 8 is a side elevational view of the embodiment of FIG. 7.
Figure 14:
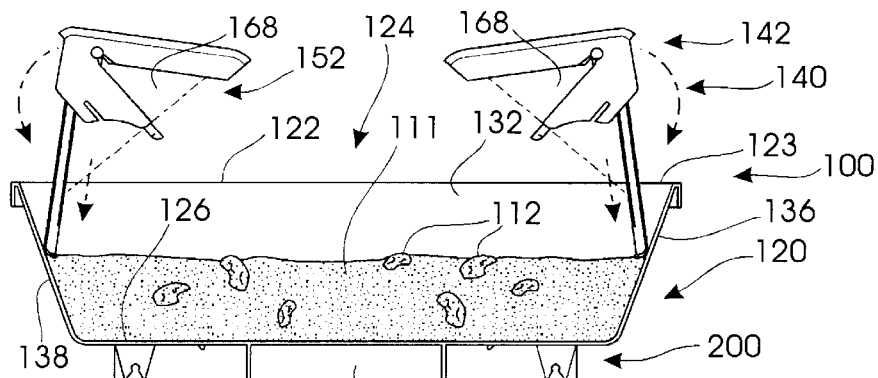
FIG. 14 is a partially fragmented cross-section side view showing a first litter cleaning step using the invention embodiment of FIGS. 1–6.
Figure 15:
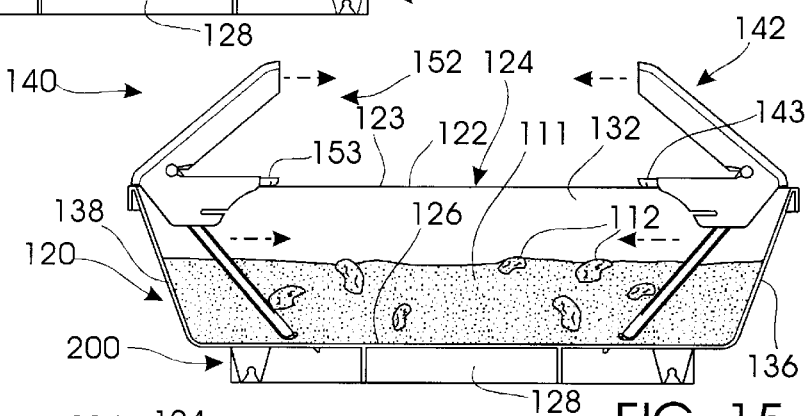
FIG. 15 is a partially fragmented cross-section view showing a second litter cleaning step following the first step of FIG. 14.
Figure 16:
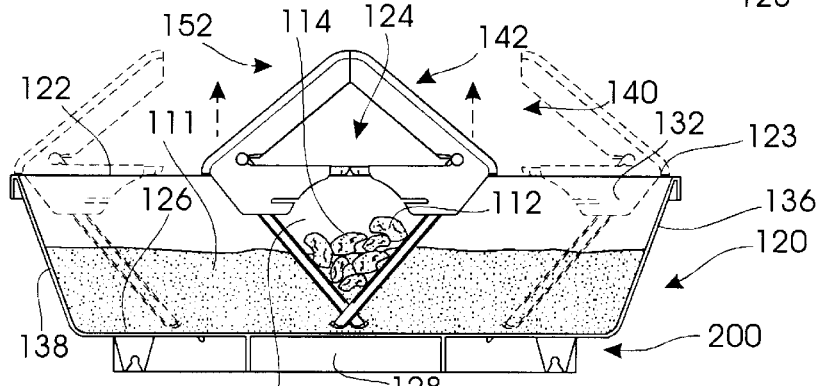
FIG. 16 is a partially fragmented cross-section view showing a third litter cleaning step following the second step of FIG. 15.
Figure 17:
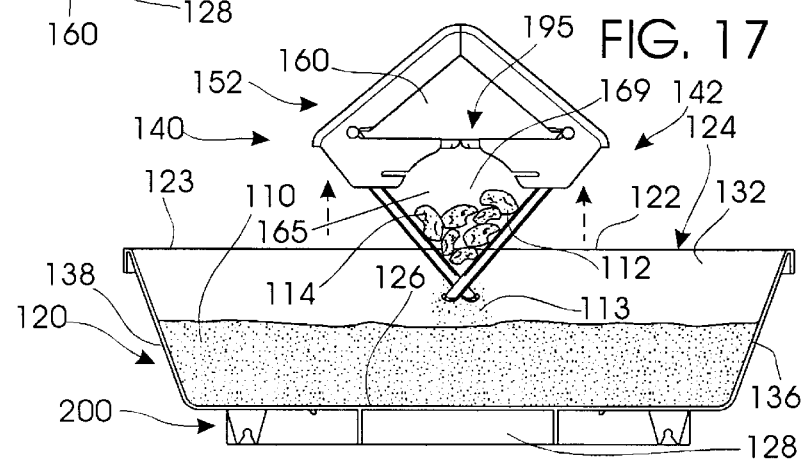
FIG. 17 is a partially fragmented cross-section view showing a fourth litter cleaning step following the third step of FIG. 16.

The cleaning process for cleaning or filtering used litter 111 is generally depicted best in FIGS. 2 and 14–21 and described as follows. First, the rakes 142 and 152, specifically the teeth 146, 156 of each respective rake, are inserted into the soiled litter 111 to be filtered at each end of the box against the slanted end walls 136, 138 of the box 120 (FIGS. 14, 15, 2). At this point, the tips 149, 159, are pressed directly into the litter mass 111 adjacent to and against the sloped end wall 136 or 138. Then the rake teeth ends 148, 158 are pushed inwardly until they reach the floor 126 of the box 120, approximately 2–3 inches deep into the litter 111. When the floor 126 of the box 120 has been contacted by the tips 149, 159, each rake 142, 152 is then pushed horizontally forward (as indicated by arrow 210, FIGS. 2, 14, 15) until the respective rakes 142 or 152 and handles 144 or 154 rest on rail 123 along the top of the frame 122.

In accordance with the exemplary embodiments of FIGS. 1–9 and 12–21, side runners or sleds 143, 153 pivotally attached to the side walls of the rakes, guide the rakes 142, 152, along the rails 123 and the rake teeth 146, 156, as they enter the litter and subsequently move through the litter 111 in the box 120, until the completion of the litter cleaning process. In accordance with another embodiment as shown in FIG. 23 of the drawings, grooves 141 can be added in the slanted end walls 136, 138 of the litter box 120 or 121 to facilitate insertion of the teeth 146, 156 into the litter. In all embodiments, following this initial procedure cleans the first few inches of soiled litter adjacent the end walls.

The rakes 142 and 152 are then pushed simultaneously or individually toward each other (as indicated by arrow 215) with, for example, one hand on each rake until reaching approximately the center of the box 120 ( FIGS. 2, 16, 18, 19). As the rakes 142, 152 move toward the center, the debris 112 contained in the box is pushed forward by the rake teeth while clean litter 113 flows through gaps between the teeth 146, 156.

As the rakes 142, 152 near each other, a unique feature of the device becomes very apparent. Due to the angle at which the rakes 142, 152 are aligned (approximately 40 degrees from vertical) and the horizontal spacing of their teeth 146, 154 (alternating across the width of the rakes), when the rakes 142 and 152 are pushed together, the teeth 146, 156 meet and pass through each other to interlock. This interlocking action forms the V-shaped collection chamber area 165, and the collected debris 114 that has been pushed together by the first two processes is now captured inside this V-shaped chamber area 165. In other possible designs, the rakes could be curved in a concave shape to form a round collection chamber or formed with a 90° elbow to create a square or rectangular chamber. The V-shaped chamber is the preferred and most effective design.

In one embodiment, the rake is designed so that above the teeth, the frames of the two rakes 142 and 152 meet centered directly over the middle of box 120 to form the V-shaped chamber area 160, 165 and a combined handle 162. A shield 195 may be formed as well beneath the handle 162 by having sleds 143, 153 met together (FIGS. 1, 2, 7, 9 and 16–21).

A unique feature of the interlocking of the rake teeth is that, as the rake teeth pass through each other, the debris is lifted upward by the interlocking action. This leaves very little clean litter remaining in the collection chamber and subsequently reduces the possibility of dust creation from the cleaning process. With the two rakes 142 and 152 now interlocked in the box 120, and with their respective handles joined, the remaining area of soiled litter in the box can be cleaned along with the previous debris collected 114 from the first two processes. This is done by grasping the handle 162 and lifting the two interlocked rakes 142, 152 up and out of the box (as indicated by arrow 220), allowing all clean litter 113 to fall free through the teeth. The V-shaped chamber 165 now holds all of the collected debris 114 securely within the interlocked teeth 146 and 156 (FIGS. 16, 17, 20, 21).

The barrier 168 at one end of the chamber area 165 prevents the collected debris 114 from exiting at the obscured end. In one embodiment, a disposable bag 175 is held adjacent the other end of the chamber to receive wastes exiting the port 169 and waste portal 170. The bag 175 receives wastes when the user tilts the opposite end (i.e. 166, 168) upwardly to gravitationally feed the collected debris 114 trapped in the chamber area 165 into the bag 175. The debris 114 is removed by simply turning end 164 downward to allow the debris to fall into the awaiting collection bag 175. This procedure can also be followed without a bag if the user would prefer to dispose of the waste, in a controlled manner, into a receptacle, or the like. The two rakes 142, 152 are then separated and/or stored for their next use.

In the embodiment discussed hereinabove, the centrally located waste removal port 169 is coupled to the bag 175 via a waste portal 170 that permits the collected wastes 114 to be conveniently removed from the chamber 160. The waste portal 170 includes the disposable bag 175 and coupling attachment for securing the bag thereto. As before, bag 175 receives the collected waste 114 for subsequent disposal. With respect to FIGS. 18, 20 and 21, the side walls 134 and 132 in the area of the receivers 135 and 133 have been removed or cut away to show the litter and debris in the interior of the box 121 and chamber 160 of cleaning assembly 140.

Thus, the present invention is directed to an improved litter box, a litter box with an associated cleaning assembly, a cleaning assembly that may utilize a bag, and/or a litter box that may include storage areas for the cleaning assembly.

The present invention is also directed to a cleaning assembly including two rakes that each have a handle and a plurality spaced apart teeth.

The present invention is also directed to a method wherein, the rakes slide across the box top 122 or 122A or the liner 101 while their teeth engage the litter disposed therein. The teeth are inserted into the litter at each end of the box against the slanted end walls of the box by pressing the teeth into the litter mass adjacent thereto. Then the rake ends are pushed inwardly until they reach the floor. The rakes then slide forwardly until the rake handle rests on top of the box frame. The rakes are then pushed simultaneously toward each other until reaching the box center while the debris in the litter is collected and pushed forward by the rake teeth while clean litter flows through gaps between the teeth.

Preferably, the rake teeth are horizontally spaced to permit the rakes to interlock when they meet to form a V-shaped chamber that captures the collected debris and form a combined handle. When the interlocked rakes are lifted upwardly, all remaining clean litter falls free through the teeth while the chamber retains the collected debris. A barrier at one end of the chamber prevents debris from exiting while the other end forms an open waste removal port. The debris exits the chamber from the port when the obstructed end is tilted upwardly.

Also, the cleaning assembly may include a coupling for temporarily securing a bag to the port. After emptying the chamber, the rakes are separated, cleaned and stored. The base of the litter box may include an area for storing the rakes.

Figure 22:
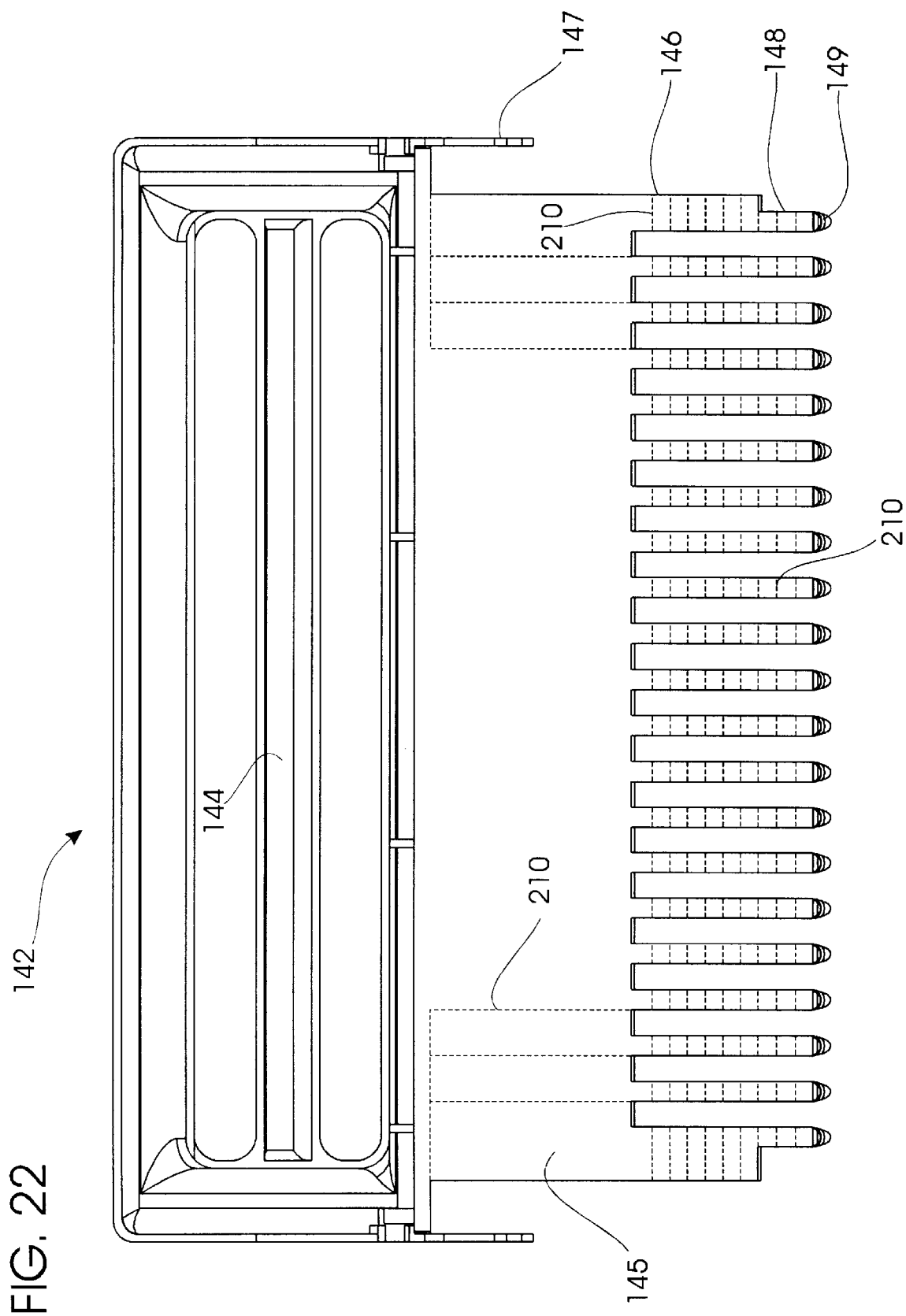
FIG. 22 is an elevational view of the interior of a modified rake.

In yet another exemplary embodiment shown in FIG. 22, the width of each rake may be further adjusted by removing teeth along one or more break line 210.

Whereas, the present invention has been described in relation to the drawings attached hereto, it should be understood that other and further modifications, apart from those shown or suggested herein, may be made within the spirit and scope of this invention. For example, more or less rakes, rakes of varying width, other dimensions, or modified can be used with the present invention.

What is claimed is:

1. A cleaning system for filtering wastes from litter contained in a litter box having a substantially box-like frame with an open top, said system comprising:

two rakes adapted to be placed upon said frame adjacent said top, each of said rakes comprising a handle supporting a plurality of spaced apart teeth adapted to be inserted into said litter; and, said rakes can slide across said top while said teeth filter said litter to collect wastes therefrom until said rakes meet to form a collection chamber containing said collected wastes, said collection chamber adapted to be removed from said box to dispose of said collected wastes remotely.

2. The system as recited in claim 1 wherein said teeth are removably secured to each of said rakes so that said teeth may be removed from said rakes for individual cleaning.

3. The system as recited in claim 1 wherein said collection chamber further comprises spaced apart ends and wherein one of said ends is obstructed while the other of said ends forms a substantially unobstructed removal port.

4. The system as recited in claim 1 wherein said collection chamber further comprises a unitary handle formed by said rakes meeting.

5. The system as recited in claim 1 wherein said box further comprises an interior bounded by said top and a spaced apart floor and having spaced apart side walls and sloping end walls, each of said side walls defining a cavity adjacent opposite one another and further comprising a waste portal coupled to one of said cavities and an obstructing wall coupled to the other of said cavities.

6. The system as defined in claim 5 wherein said waste portal is adapted to couple to said substantially unobstructed end of said collection chamber and wherein said obstructing wall is adapted to couple to said obstructed end of said collection chamber during the formation of said collection chamber.

7. The system as defined in claim 6 wherein said waste portal further comprises means for temporarily coupling a disposable bag to said waste portal.

8. The system as defined in claim 7 wherein said means for temporarily coupling comprises an inner lip protruding from said waste portal and an exterior ring hinged to said portal, said ring adapted to fit over said lip to secure said bag therebetween.

9. An improved litter box with a cleaning system for filtering wastes from litter contained in said box, said box comprising:

a frame with a substantially open top and a floor, said top and said floor separated by spaced apart, substantially parallel side walls and sloping end walls, said frame defining an interior containing said litter; and, a cleaning assembly adapted to be placed upon and slide along said sides adjacent said top, said cleaning assembly adapted to filter said litter to remove wastes contained therein.

10. The box as recited in claim 9 wherein said cleaning assembly comprises two rakes adapted to be inserted into said litter adjacent each of said sloping end walls when cleaning said litter, each of said rakes comprising a handle supporting a plurality of spaced apart teeth adapted to be inserted into said litter.

11. The box as recited in claim 10 wherein said rakes are adapted to filter said litter by being pushed away from said end walls toward each other until meeting to form a collection chamber containing said collected wastes, said collection chamber adapted to be removed from said box to dispose of said collected wastes remotely.

12. The box as recited in claim 11 wherein said teeth are removably secured to each of said rakes.

13. The box as recited in claim 11 wherein said collection chamber further comprises spaced apart ends and wherein one of said ends is obstructed while the other of said ends forms a substantially unobstructed removal port.

14. The box as recited in claim 13 wherein said collection chamber further comprises a unitary handle and a shield formed by said rakes meeting.

15. The box as recited in claim 13 wherein each of said side walls further comprise a cavity opposite one another and wherein said cleaning assembly further comprises a waste portal coupled to one of said cavities and an obstructing wall coupled to the other of said cavities.

16. The box as defined in claim 15 wherein said waste portal is adapted to couple to said substantially unobstructed end of said collection chamber and wherein said obstructing wall is adapted to couple to said obstructed end of said collection chamber during the formation of said collection chamber.

17. The box as defined in claim 16 wherein said waste portal further comprises means for temporarily coupling a disposable bag to said waste portal.

18. The box as defined in claim 17 wherein said means for temporarily coupling comprises an inner lip protruding from said portal and an exterior ring hinged to said portal, said ring adapted to fit over said lip to secure said bag therebetween.

19. An improved litter box with a cleaning system for filtering wastes from litter contained in said box, said box comprising:

a frame with a substantially open top and a floor, said top and said floor separated by spaced apart, substantially parallel side walls and sloping end walls, said frame defining an interior containing said litter;

a cleaning assembly adapted to be placed upon and slide along said sides adjacent said top, said cleaning assembly adapted to filter said litter to remove wastes contained therein, said cleaning assembly comprising two rakes adapted to be inserted into said litter adjacent each of said sloping end walls when cleaning said litter, each of said rakes comprising a handle supporting a plurality of spaced apart, teeth adapted to be inserted into said litter to filter said litter, said rakes filtering said litter by being pushed away from said end walls toward each other until meeting to form a collection chamber containing said collected wastes, said collection chamber adapted to be removed from said box to dispose of said collected wastes remotely; and, wherein said collection chamber comprises spaced apart ends, one of said ends being substantially obstructed while the other of said ends forms a substantially unobstructed removal port.

20. The box as recited in claim 19 wherein said collection chamber further comprises a unitary handle formed by said rakes meeting.

21. The box as recited in claim 19 wherein each of said side walls further comprise a cavity opposite one another and wherein said cleaning assembly further comprises a waste portal coupled to one of said cavities and an obstructing wall coupled to the other of said cavities.

22. The box as defined in claim 21 wherein said waste portal is adapted to couple to said substantially unobstructed end of said collection chamber and wherein said obstructing wall is adapted to couple to said obstructed end of said collection chamber during the formation of said collection chamber.

23. The box as defined in claim 22 wherein said waste portal further comprises means for temporarily coupling a disposable bag to said waste portal.

24. The box as defined in claim 23 wherein said means for temporarily coupling comprises an inner lip protruding from said portal and an exterior ring hinged to said portal, said ring adapted to fit over said lip to secure said bag therebetween.

25. An improved litter box with a cleaning system for filtering wastes from litter contained in said box, said box comprising:

a frame with a substantially open top and a floor, said top and said floor separated by spaced apart, substantially parallel side walls and sloping end walls, each of said side walls comprising a cavity opposite one another, said frame defining an interior containing said litter;

a cleaning assembly adapted to be placed upon and slide along sides adjacent said top, said cleaning assembly adapted to filter said litter to remove wastes contained therein, said cleaning assembly comprising rake adapted to be inserted into said litter adjacent each of said sloping end walls when cleaning said litter, each of said rakes comprising a handle supporting a plurality of spaced apart, teeth adapted to be inserted into said litter to filter said litter, said rakes filtering said litter by being pushed away from said end walls toward each other until meeting to form a collection chamber containing said collected wastes, said rakes also coupling to a waste portal coupled to one of said cavities and an obstructing wall coupled to the other of said cavities;

said collection chamber comprising spaced apart ends, one of said ends being substantially obstructed by said wall while the other of said ends forms a substantially unobstructed removal port adjacent said waste portal, and wherein said chamber is adapted to be removed from said box to dispose of said collected wastes remotely.

26. The box as recited in claim 25 wherein said collection chamber further comprises a unitary handle formed by said rake meeting.

27. The box as defined in claim 25 wherein said waste portal further comprises means for temporarily coupling a disposable bag to said waste portal.

28. The box as defined in claim 27 wherein said means for temporarily coupling comprises an inner lip protruding from said portal and an exterior ring hinged to said portal, said ring adapted to fit over said lip to secure said bag therebetween.

29. A rake being one of a pair of rakes which form a cleaning assembly for cleaning soiled litter in a litter box, comprising: a rake having a handle and a plurality of spaced apart teeth adapted to be inserted into said soiled litter adjacent an end wall of said litter box and adapted to filter said litter, by spanning the width of said box and being pushed away from said end wall toward the other end wall of said box.

30. The rake as recited in claim 29 wherein each of said teeth has a flat leading edge to facilitate filtration of the litter.

* * * * *